United States Patent Office 3,615,147
Patented Oct. 26, 1971

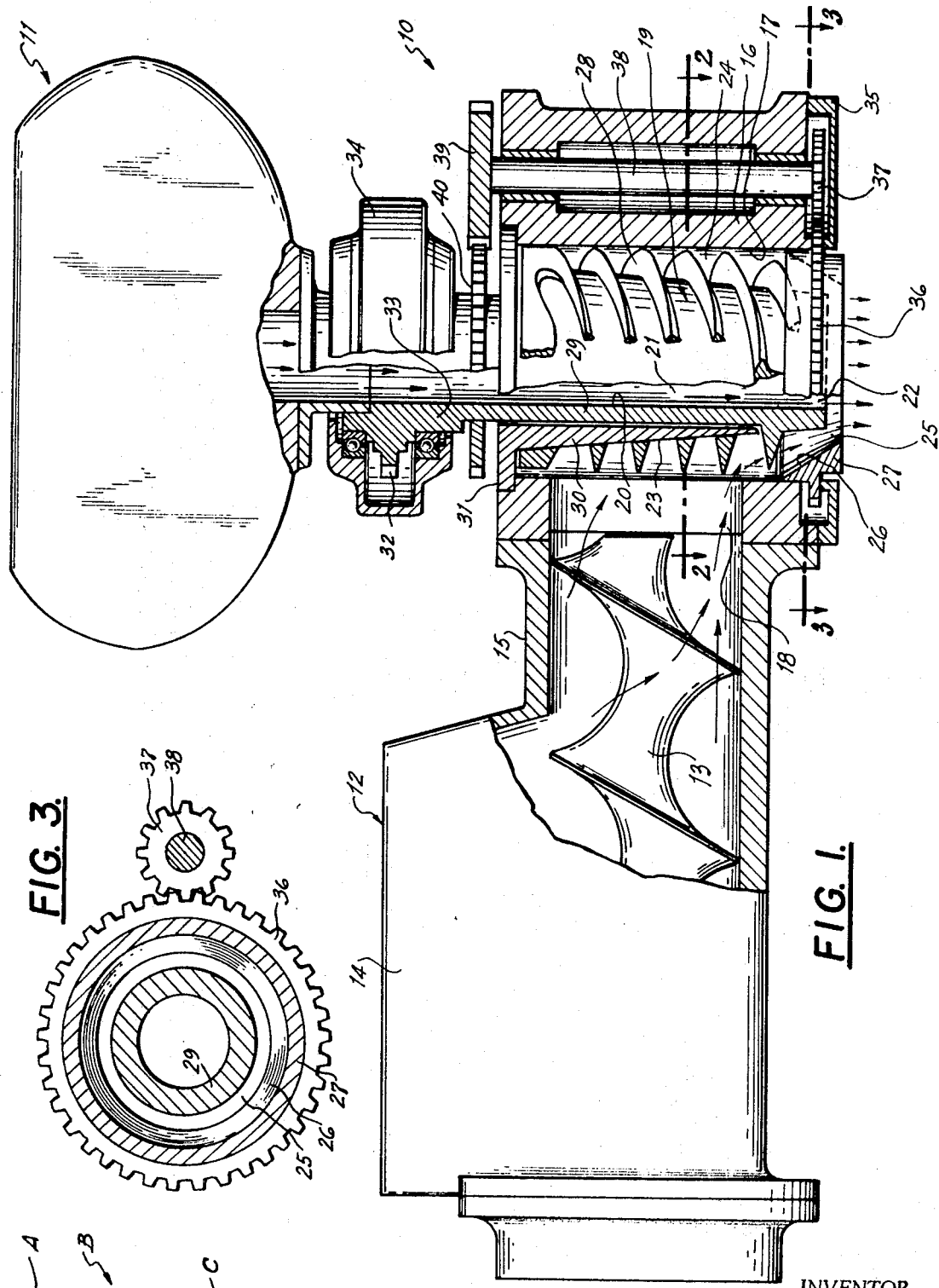
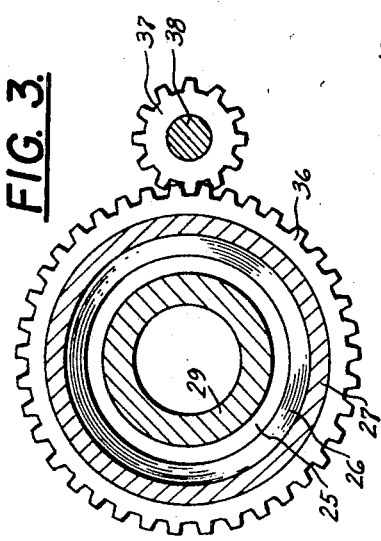
FIG. 3.
FIG. 1.
FIG. 4.
INVENTOR.
TORAHIKO HAYASHI
BY
ATTORNEY.

3,615,147
APPARATUS FOR MOLDING AN OUTER LAYER OF VISCOUS MATERIAL ABOUT A CORE OF ANOTHER MATERIAL
Torahiko Hayashi, 2-3 Nozawa-cho,
Utsunomiya-shi, Japan
Filed Jan. 9, 1969, Ser. No. 790,099
Claims priority, application Japan, Jan. 13, 1968,
43/1,585
Int. Cl. A21c 11/20
U.S. Cl. 107—1       9 Claims

ABSTRACT OF THE DISCLOSURE

An apparatus for molding bread dough or other viscous material as an outer layer or crust about a core of another material, such as jam or cream, has a hollow assembly defining an inner passage with a discharge opening at one end through which the core material issues, and a housing extending around the hollow assembly and spaced radially from the latter to define an outer passage in which the crust material is propelled by a rotary conveyor screw to issue through an annular outlet defined between the hollow assembly and a ring member which is rotated independently of the conveyor screw, and preferably at a lower speed than the latter. Further, it is preferred that the conveyor screw consist of a helical rib member having the spaces between its turns closed at their radially inner sides by the outer surface of the hollow assembly and as to which the helical rib member is rotatable.

---

Figure 2:
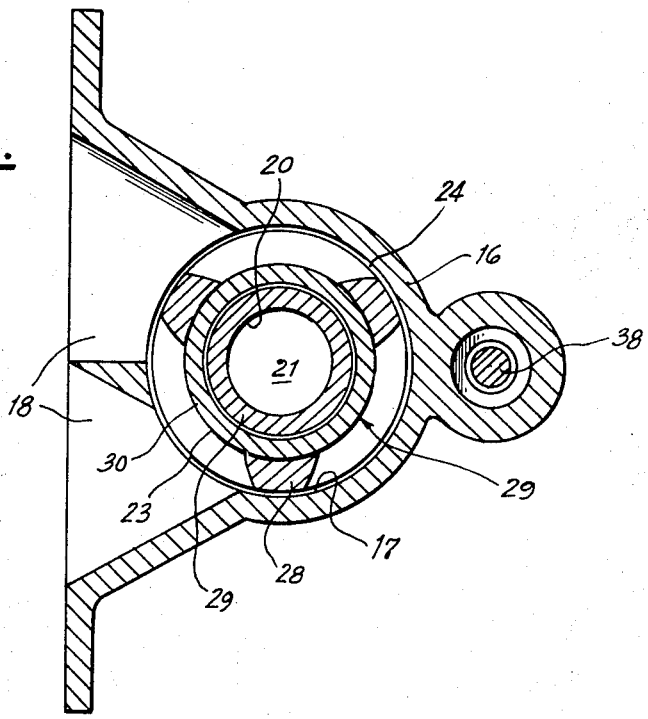

This invention relates to an apparatus for molding two different materials into an elongated article having a core of one material and an outer layer of another material. More particularly, this invention is directed to providing an apparatus for molding materials into an elongated cylindrical article having an outer layer or crust of cake dough, bread dough, or some similar viscous material, and a core surrounded by the crust and formed of a material which can easily be made to pass through a rather narrow pipe or tubular member by an outside pressure or the force of gravity, such as jam, cream or the like.

In the past, food products consisting of a material such as bread dough wrapped around a material such as jam or cream have been either molded entirely by hand or put together from bread dough which has been mechanically rolled and a core material which has been mechanically supplied in two separate operations. Devices heretofore proposed for supplying both the crust material and the core material and for molding them, all in one simultaneous operation, have had certain disadvantageous characteristics.

Thus, for example, in an apparatus proposed for molding biscuit dough around a core material, there is a device which has two concentric cylinders, the outer of which is filled with crust material, the inner with core material, and a piston is actuated to push the materials through an aperture at one end of the device and thus mold the materials into a covered cylindrical shape. However, this device is not suitable when the crust material to be molded is a viscous material such as bread dough, whose elasticity and extensibility must be carefully balanced. The use of this device injures the quality of the dough material, and results in an inferior finished product.

The present inventor has previously developed an apparatus generally similar to those embodying the present invention, for molding food materials into an elongated article having a core and outer layer or crust of different materials, and which is disclosed in U.S. patent application No. 719,465, now abandoned. This previous apparatus employs a conveyor screw for propelling the bread dough or crust material through an annular outlet defined between a ring and an inner pipe through which the core material passes. As the crust material is formed into a tubular shape and driven downward by the screw, this ring serves to keep the wall thickness of the tubular shape within fixed limits. However, in this previous apparatus, the ring and the screw turn at the same angular velocity, with the result that the thin or weak places caused by the action of the screw threads upon the crust material are not entirely eliminated as the crust material is driven through the ring, so that perfect uniformity of the wall thickness of the crust material cannot be obtained.

Furthermore, the screw employed in this previous apparatus is of a traditional form, that is, its threads and its shank which defines the valleys between the threads are integral with each other. However, under certain circumstances, such a screw is inappropriate for delivering bread dough and other types of dough whose texture can easily be destroyed by the agitation and pressure generated therein during delivery or extension by a conventional conveyor screw.

Accordingly, it is an object of the present invention to provide an apparatus which avoids the foregoing defects while molding cake dough, bread dough or some similar viscous material as an outer layer or crust around a core of some suitable foodstuff, such as jam or cream.

Another object of this invention is to provide an apparatus which improves the efficiency of the crust material delivery by employing a screw which over part or all of its length consists of a helical rib or ribs the turns of which are rotatable independently of the surface defining the "valleys" between such turns.

Still another object is to provide a rotary ring around the crust material outlet of such a molding apparatus and, by causing the ring to rotate at an angular velocity different from that of the screw, to provide an apparatus which facilitates the molding of the crust material into a smooth, continuous tube and at the same time keeps the crust material from bulging or bursting when it is filled with the core material.

A further object of this invention is to provide an apparatus which facilitates the molding of the core material into a cylindrical shape appropriate for enveloping in the crust material, by causing a tubular member through which the core material flows to rotate independently of the conveyor screw and of the ring member through which the crust material is extended by the conveyor screw.

In accordance with an aspect of the present invention, a rotary ring is placed at the bottom or delivery end of the conveyor screw for the crust material and is turned at an angular velocity different from that of the screw, so that it is capable of smoothing the thin or weak places which have been developed in the crust material by the action of the screw threads upon the crust material, whereby uniformity of the wall thickness of the crust material can now be easily achieved.

Although the defects which appear when the rotary ring is caused to turn at exactly the same angular velocity as the screw may be avoided by extending the rotary ring and also the bottom end of the screw to form a nozzle section within which the threads of the conveyor screw are removed, this procedure has the side effect of increasing the internal pressure of the material as it moves past the rotary ring, so that the internal tissue of the material is destroyed. The arrangement according to the present invention, however, is able to avoid this injurious side effect entirely by rotating the rotary ring at an angular velocity different from that of the screw, especially at an angular velocity slightly slower than that of the screw. Furthermore, even if the thread of the screw is extended into the annular outlet surrounded by the rotary ring, the delivery efficiency of the screw will not be reduced, and the desired molding will be achieved without compressing the crust material.

Another advantageous feature of the apparatus according to this invention resides in the fact that the density of the core material is evened out and the core material is molded into a continuous cylindrical bar shape suitable for wrapping with the crust material.

If, instead of the conveyor screw having its helical rib or ribs rotated independently of the surface defining the valleys between turns of the rib or ribs an ordinary screw is employed to deliver the crust material, a material such as bread dough, whose connective tissue is relatively strong and resilient, will be cut by the blades of the screw into sections and will not become a smooth, continuous tube for enveloping the core material.

The object of fermentation is to turn bread dough into a spongy mass of gluten tissues. The quality of the dough before fermentation must satisfy strict requirements if this is to be accomplished well. The internal structure of the dough must be consolidated in one mass. The extensibility of the dough is another important factor, particularly in baking high quality bread. Thus, if the dough is molded in a machine that cuts and divides the gluten tissues, the necessary requirements given above will not be met.

The apparatus according to the present invention molds resilient material such as bread dough into a continuous tubular shape without disturbing its quality at all, and at the same time fills the inside of the tube with core material, such as jam, cream, or the like.

Figures 5, 6:
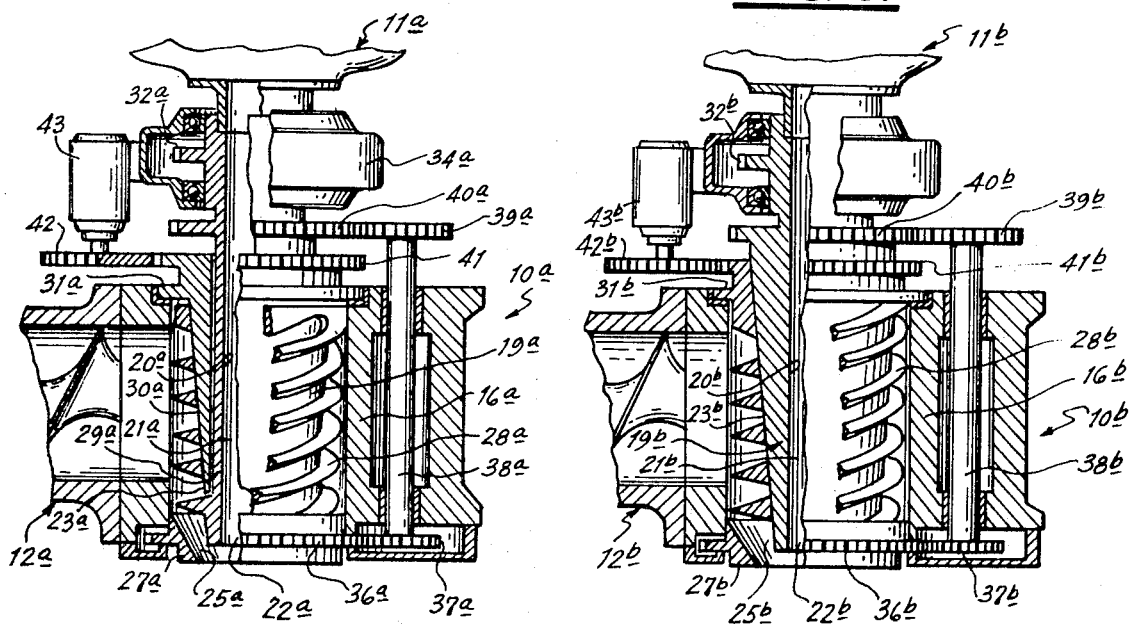

The above, and other objects, features and advantages of the invention, will be apparent in the following detailed description of illustrative embodiments thereof which is to be read in connection with the accompanying drawings, wherein:

FIG. 1 is a side elevational view, partly broken away and in section, of an apparatus according to this invention;

FIGS. 2 and 3 are horizontal cross-sectional views taken along the lines 2—2 and 3—3, respectively, on FIG. 1;

FIG. 4 is a fragmentary perspective view of a food article of the type to be molded by the apparatus according to this invention; and FIGS. 5 and 6 are views similar to portions of FIG. 1, but showing two other embodiments of the invention.

Referring to the drawings in detail and initially to FIG. 1 thereof, it will be seen that the apparatus 10 according to this invention, as there shown, has associated therewith a device 11 for feeding or supplying a first material which is to form the core A of an elongated article B (FIG. 4), and a device 12 for feeding or supplying a second material which is to be formed into an outer layer or crust C surrounding the core A. Although various types of devices may be employed for supplying the core material, the device 11 schematically illustrated in FIG. 1 is of a type that supplies such material at an accurately measured rate and is disclosed in detail in the present applicant's copending application for U.S. Letters Patent identified as Ser. No. 732,807 (corresponding to Japanese patent application No. 22449/67) now abandoned. The device 12 for feeding or supplying the outer layer or crust material to apparatus 10 may also be varied and, in FIG. 1, such device 12 is shown simply to include a suitably rotated conventional conveyor screw 13 extending from a container 14 for the crust material into an outlet cylinder 15 to propel the crust material along cylinder 15. However, greater efficiency can be achieved if the device 12 is of a type described in detail in the present applicant's copending application for U.S. Letters Patent identified as Ser. No. 783,298, filed Dec. 12, 1968 (corresponding to Japanese patent application No. 79468/67), and in which the conventional conveyor screw 13, as shown, is replaced by one having a helical rib extending along a separately formed shank and being rotatable independently of the shank.

The apparatus 10, as shown on FIG. 1, comprises a housing 16 having a cylindrical inner surface 17 with a vertical axis and a port 18 opening through surface 17 at one side of housing 16 for admitting the crust material supplied by device 12. A hollow assembly 19 is arranged in housing 16 coaxially with cylindrical surface 17 and has an inner surface 20 defining an inner passage 21 in which the core material supplied by device 11 to the upper end of the passage may flow for discharge from passage 21 through an opening 22 at the lower end of hollow assembly 19. Hollow assembly 19 further has an outer surface 23 which may taper downwardly, as shown, and is spaced radially from housing surface 17 to define an outer passage 24 therebetween for the crust material admitted through port 18. An annular outlet 25 for the crust material from outer passage 24 is defined between the lower end portion of surface 23 and an inner surface 26 of a ring member 27 mounted within the lower end portion of housing 16 so as to be concentric with the axis of cylindrical surface 17. Surface 26 of ring member 27 is frusto-conical, as shown, or otherwise tapers downwardly from a maximum diameter at its upper end which is equal to the diameter of surface 17 to a diameter, at the radial plane of the discharge opening 22, which is slightly larger than the outer diameter of surface 23 at the lower end of hollow assembly 19, and further to a minimum diameter at the lower end of ring surface 26 which is larger than the diameter of discharge opening 22.

A rotary conveyor screw 28 is provided within outer passage 24 for propelling the crust material downwardly in passage 24 to annular outlet 25. Conveyor screw 28 preferably is constituted by a helical rib extending around outer surface 23 of hollow assembly 19 so that the turns of the helical rib define a helical channel therebetween in passage 24, with such channel being closed at its radially inner and outer sides of the surfaces 23 and 17, respectively, and with the helical rib of conveyor screw 28 being rotatable independently of at least a portion of surface 23. In the embodiment of FIGS. 1-3, the rotation of the helical rib of conveyor screw 28 independent of at least a portion of surface 23 is made possible by forming hollow assembly 19 of a rotatable tubular member or pipe 29 which, at its inside, defines surface 20 of inner passage 21, and a sleeve 30 which extends around tubular member 29 for a substantial portion of the length of the latter within housing 16 and which is radially interposed between tubular member 29 and those turns of the helical rib of conveyor screw 28 having an axial extent coinciding with sleeve 30. A radially outward directed flange 31 is provided at the upper end of sleeve 30 to close the upper end of outer passage 24 and to mount sleeve 30 within housing 16, with sleeve 30 being held suitably against rotation in the embodiment of FIGS. 1-3.

In the apparatus 10, as shown, tubular member 29 has a lower end portion of outwardly increased wall thickness (FIG. 1) and sleeve 30 extends around tubular member 29 only above such lower end portion of the latter. Thus, the lower end portion of surface 23 which cooperates with surface 26 of ring member 27 to define outlet 25 therebetween is constituted by the outer surface of the lower end portion of tubular member 29 and the remainder of surface 23 is constituted by the outer surface of sleeve 30 which may be stationary, as described above. Further, the lower end portion of the helical rib or conveyor screw 28 may be joined integral with, or otherwise secured to the lower end portion of tubular member 29 for rotation with the latter independently of sleeve 30, and hence of the portion of surface 23 defined by the latter.

The rotation of tubular member 29 and of conveyor screw 28 therewith may be effected by a suitable drive, (not shown) which engages a sprocket or gear 32 fixed on an upward extension 33 of tubular member 29 which is journalled in a suitably fixed housing 34 located between device 11 and housing 16.

In accordance with this invention, ring member 27 is rotatable relative to hollow assembly 19 and conveyor screw 28. In the embodiment of FIGS. 1–3, the foregoing is achieved by rotatably holding ring member 27 at the bottom of housing 16 by means of a retainer member 35 which has bearing engagement, from below, with a gear 36 extending radially from ring member 27 and which is suitably driven, for example, from tubular member 29, as by a gear 37 meshing with gear 36 and being fixed on the lower end of a shaft 38 journalled in housing 16 and having a gear 39 fixed on its upper end portion and meshing with a gear 40 secured on tubular member 29 above housing 16 (FIGS. 1 and 3). It will be apparent that the rotational speed of ring member 27 relative to tubular member 29 and conveyor screw 28 is dependent upon the ratios of gears 36, 37, 39 and 40, which can be suitably varied. It has been found that, in the case of a bread dough used for the material of outer layer or crust C, the optimum ratio of the rotational speed of ring member 27 to the rotational speed of conveyor screw 28 is in the range between 93:100 and 96:100.

The described apparatus 10 operates as follows:

The core material fed by device 11 to inner passage 21 continuously issues from the latter through the discharge opening 22 at the lower end in the form of a continuous cylindrical core A. Simultaneously, the outer layer or crust material fed by device 12 to outer passage 24 is propelled downwardly in the latter by the rotated conveyor screw 28 to issue through annular outlet 25 in the form of a continuous tubular outer layer or crust C surrounding the core A. Since sleeve 38 which defines the "valleys" between turns of the helical rib member constituting conveyor screw 28 is held against rotation with the latter, it is apparent that rotation of the crust material with conveyor screw 28 is frictionally resisted at both the inside and outside surfaces of the helical channel defined between turns of the rotated helical rib member, whereby the efficiency of the latter in propelling the crust material to and through outlet 25 is substantially increased as compared with that of a conventional conveyor screw in which the shank defining the valleys between the turns of the screw thread or helical rib rotates with the latter.

Even with the described increased efficiency of conveyor screw 28, the crust material is propelled thereby to annular outlet 25 in an irregular shape, that is, more or less in the shape of a helix, and the described rotation of ring member 27 in the same direction as conveyor screw 28, but at a somewhat lower speed, serves to form the irregularly delivered crust material into a smooth, continuous tube during its passage through outlet 25. The rotary ring member 27, particularly when it extends below the lower end of tubular member 29, and hence below the discharge opening 22 for the core material, further serves to prevent bulging or bursting of the outer layer or crust C as the latter is filled with the core material issuing from discharge opening 22.

Although the sleeve 30 defining the outer surface 23 of hollow assembly 19 is held stationary to enhance the propelling efficiency of the rotated conveyor screw 28 in the embodiment of FIGS. 1–3, as described above, such propelling efficiency may be further increased by rotating the sleeve in the direction opposed to the rotation of the screw conveyor so that the surface of the sleeve exposed between the turns of conveyor screw 28 will frictionally urge the crust material to turn counter to the rotation of the conveyor screw. Thus, as shown on FIG. 5, an apparatus 10a according to this invention which is generally similar to the apparatus 10 and which has its corresponding parts identified by the same reference numerals, but with the letter a appended thereto, may have the sleeve 30a of its hollow assembly 19a rotatably mounted at its flange 31a in housing 16a. Further, sleeve 30a may be provided with a gear 41 meshing with a gear 42 driven by a motor 43, which may be of a reversible, variable-speed type. Thus, while conveyor screw 28a is driven in one direction with tubular member 29a through sprocket 32a and ring 27a is driven in the same direction as tubular member 29a but at a lower speed through gears 36a, 37a, 39a and 40a, sleeve 30a may be rotated in the opposite direction, held at rest or rotated in the same direction, but at a different speed, merely by suitably controlling the operation of reversible, variable speed motor 43. The foregoing permits precise control of the delivery of the crust material to annular outlet 25a.

In the above described embodiments of the invention, the inner surface 20 or 20a of hollow assembly 19 or 19a has been constituted by a tubular member 29 or 29a which is separate from, and independently rotatable with respect to the sleeve 30 or 30a defining a major portion of the outer surface 23 or 23a so that the conveyor screw 28 or 28a fixed to tubular member 29 or 29a, can rotate independently of the portion of surface 23 or 23a defined by the mentioned sleeve 30 or 30a. However, as shown on FIG. 6 in which parts of an apparatus 10b according to this invention are identified by the same reference numerals employed in connection with the corresponding parts on FIGS. 1–3, but with the letter b appended thereto, the hollow assembly 19b of such apparatus may consist of a one-piece tubular member 29b which, at the inside, defines inner surface 20b and hence passage 21b, while the outside of the one-piece tubular member 29b defines outer surface 23b. In the embodiment being described, tubular member 29b may be rotated by way of sprocket 32b with ring member 27b being rotated from tubular member 29b, but at a lower speed, by way of gears 36b, 37b, 39b and 40b. However, in order to permit rotation of conveyor screw 28b independently of surface 23b defining the valleys between its turns, such conveyor screw 28b is formed independently of tubular member 29b and has its upper end portion joined to, and supported from a flange 31b rotatable in a bearing carried by housing 16b. Secured to flange 31b is a gear 41b which meshes with a gear 42b driven by a variable speed motor 43b. Thus, by controlling the speed of motor 43b, conveyor screw 28b may be rotated at a speed greater than the rotational speed of surface 23b and also greater than the rotational speed of ring member 27b. Further, by suitably selecting the ratios of gears 36b, 37b, 39b and 40b, the rotational speed of surface 23b may be made far lower than the rotational speed of screw 28b while the rotational speed of ring member 27b is only slightly slower than that of screw 28b, for example, in the range of ratios from 93:100 to 96:100, as previously indicated.

It will be apparent that, in all of the described embodiments of this invention, the ring member which defines the outer surface of the outlet 25, 25a or 25b is rotated at a different speed than the conveyor screw 28, 28a or 28b by which the crust material is propelled through such outlet, and such relative rotation has been found to result in the extrusion of a tube of crust material of uniform wall thickness and density, even when the lower end of the helical rib of screw conveyor 28, 28a or 28b extends below the upper edge of the ring member 27, 27a or 27b, as shown.

Further, since the surface 23, 23a or 23b defining the valleys between turns of the conveyor screw 28, 28a or 28b, is either stationary or rotated in the opposite direction to the screw, the crust material is propelled strongly downward by the screw threads with little or no rotation with the latter so that there is very little destruction of the internal tissues of the crust material and very little build-up of the internal pressure in such material so that the quality of the latter can be preserved.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. Apparatus for molding an elongated article having a core of one material and an outer layer of another material surrounding said core, said apparatus comprising hollow means defining an inner passage in which said one material may flow for discharge therefrom through an opening at one end of said hollow means, a housing extending around said hollow means and spaced from the outer surface of the latter to define an outer passage therebetween for said other material, a ring member carried by said housing and cooperating with said hollow means adjacent said one end of the latter to define therebetween an outlet from said outer passage, rotary conveyor means within said outer passage for propelling said other material through said outer passage to said outlet, and means to effect rotation of said ring member relative to said hollow means and said rotary conveyor means.

2. Apparatus according to claim 1, in which said rotary conveyor means includes a rotated helical rib member extending around said hollow means and having turns defining a helical channel therebetween which is closed at its radially inner side by said outer surface of the hollow means, and said helical rib member is rotatable independently of at least a portion of said outer surface of the hollow means.

3. Apparatus according to claim 2, in which said hollow means includes a rotatable tubular member the inner surface of which constitutes said inner passage, an end portion of said helical rib member is fixed to said tubular member for rotation with the latter and the remainder of said helical rib member is spaced radially outward from said tubular member, and said hollow means further includes a sleeve member interposed between said tubular member and said remainder of the helical rib member and constituting said portion of the outer surface of the hollow means as to which said helical rib member is independently rotatable.

4. Apparatus according to claim 3, in which said sleeve member is fixedly mounted.

5. Apparatus according to claim 3, in which means are provided to effect rotation of said sleeve member independently of said tubular member and helical rib member and of said ring member.

6. Apparatus according to claim 3, in which said means to effect rotation of said ring member includes rotary transmission means driven from said tubular member and operatively connected with said ring member.

7. Apparatus according to claim 2, in which said hollow means is comprised of a tubular member which, at its inside, constitutes said inner passage and, at its outside, defines said outer surface of the hollow means, and said helical rib member is rotatable independently of said tubular member.

8. Apparatus according to claim 2, in which said ring member has a frusto-conical inner surface decreasing in diameter in the axial direction in which said other material is propelled to said outlet and having a minimum diameter greater than that of the discharge opening at said one end of said hollow means.

9. Apparatus according to claim 8, in which said helical rib member terminates short of said one end of the hollow means at an axial location intermediate the relatively large and small diameter ends of said frusto-conical surface of the ring member.

References Cited
UNITED STATES PATENTS

| | | | |
|---|---|---|---|
| 121,406 | 7/1918 | Winfrey | 107—1.4 |
| 1,392,034 | 9/1921 | Westerman | 107—1.4 |

LOUIS K. RIMRODT, Primary Examiner

U.S. Cl. X.R.

107—14